Patented Mar. 24, 1925.

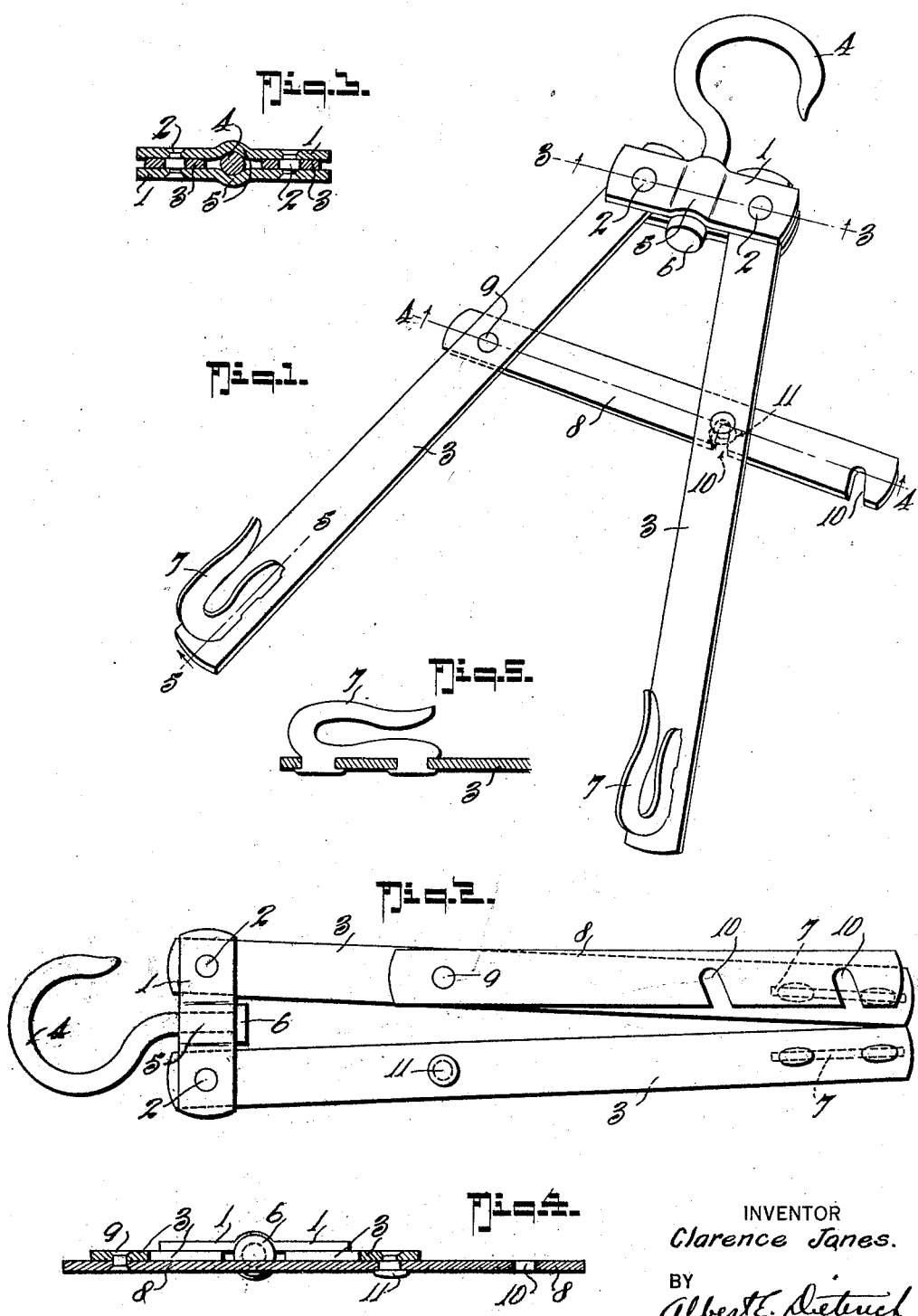

1,530,675

UNITED STATES PATENT OFFICE.

CLARENCE JANES, OF ONEIDA, NEW YORK.

COLLAPSIBLE ANIMAL-SKINNING SUPPORT.

Application filed March 6, 1924. Serial No. 697,416.

*To all whom it may concern:*

Be it known that I, CLARENCE JANES, a citizen of the United States, residing at Oneida, in the county of Madison and State of New York, have invented a Collapsible Animal-Skinning Support, of which the following is a specification.

The invention relates to trappers' appliances and has for its object to provide a support upon which the trapper may secure an animal to facilitate the skinning thereof, which is adjustable to adapt it to use on varied sizes of animals, and which is collapsible to permit packing thereof for being carried about by the trapper without inconvenience.

With the above and other objects in view, the invention further resides in those novel details of construction, combination of and arrangement of parts, all of which will be first fully described, then be particularly pointed out in the appended claim, reference being had to the accompanying drawing, in which:—

Figure 1 is a perspective view of the invention extended for use in providing a support for facilitating the skinning of small animals.

Figure 2 is a rear face view of the device in the collapsed condition.

Figure 3 is a detail cross section taken on the line 3—3 on Figure 1.

Figure 4 is a detail cross section taken on the line 4—4 on Figure 1.

Figure 5 is a detail section taken on the line 5—5 on Figure 1.

In the drawings, in which like numerals indicate like parts in all of the figures, 1 indicates the head of the device which is in the nature of a pair of opposing plates secured together, as at 2, in a manner for providing loose pivotal connection for the arms 3 and for providing a swivel connection for the hook 4 which has the shank thereof passed through the enlarged portions 5 of the plates forming the said head, which said shank is upset at 6 to provide a retaining head.

It will be observed that the pivotal connections 2 for the arms 3 are in comparatively close relation so that when the said arms are swung together to the position illustrated in Figure 2 of the drawings, a very compact device is provided which may be readily carried by the trapper without any inconvenience.

Each arm 3 has secured thereto a hook member 7 adapted to receive one foot of the animal to be dressed or skinned.

A bar 8 is pivoted at 9 to one of the arms and is provided with one or more open slots or notches 10 adapted to be brought into engagement with the headed lug 11 carried by the other arm, in the manner illustrated in Figure 1 of the drawings, to effect a spreading of the arms 3 to the operative position shown in the figure referred to and for holding the said arms, rigidly, to that position. By reason of providing the bar 8 with a plurality of notches 10, as illustrated in the said figure 1 means is provided whereby the arms 3 may be extended to varied positions, thus adapting the same for use in properly securing the feet of animals of varied sizes.

The device is particularly adaptable for use by trappers and by reason of the adjustable and collapsible nature thereof may be conveniently carried by the said trappers and used at will and also for making such adjustment thereof as is necessary to suit the device for use in skinning large or small, animals.

When in use the device is adjusted either to the position illustrated in Figure 1 of the drawing or to the wider spread position by cooperation of the outermost notch 10 and the lug 11. With the parts in this position, the user of the device will secure the feet of the animal in the hooks 7, thus spreading the body of the animal and, by connecting the hook 4 to a suitable fixed support, the said device will be very effective in holding the animal in position for facilitating the skinning thereof, it being obvious that the swivel connection of the said hook also facilitates the skinning operation in that it will permit ready turning over of the animal during the operation.

It will be observed by reference to Figure 1 of the drawing that the notches 10 are cut on an angle directed toward the pivoted end of the bar 8. By reason of thus forming the notches when the trapper secures the feet of the animal to be dressed in the hooks 7 all pulling action directed against the hooks tends to tighten the relation of the selected notch 10 and the holding lug 11, thus effectively preventing inadvertent collapsing of the device.

It will also be observed by reference to Figure 5 that for providing for securely holding the feet of the animal the hooks 7 each include a restricted entrance.

From the foregoing description, taken in connection with the accompanying drawing, it is thought the complete construction, the manner of use thereof and the advantages of my invention will be readily apparent to those familiar with the use of such devices.

What I claim is:—

In a device of the class described, a head composed of a pair of opposed plates shaped to form a swivel bearing, a swivel hook carried by the head, a pair of straight arms pivoted between the cross head ends, a bar pivoted to one arm and provided with notches directed toward the pivoted end of the bar, a lug on the other arm cooperative with a selected notch of the first named arm in holding the arms diverged to operative condition, and a securing hook at the free end of each arm whereby the animal to be dressed may be secured thereto, each said hook including a restricted entrance as and for the purposes described.

CLARENCE JANES.